June 25, 1935.  E. J. BELL  2,006,193
HEATING SYSTEM
Filed June 10, 1932
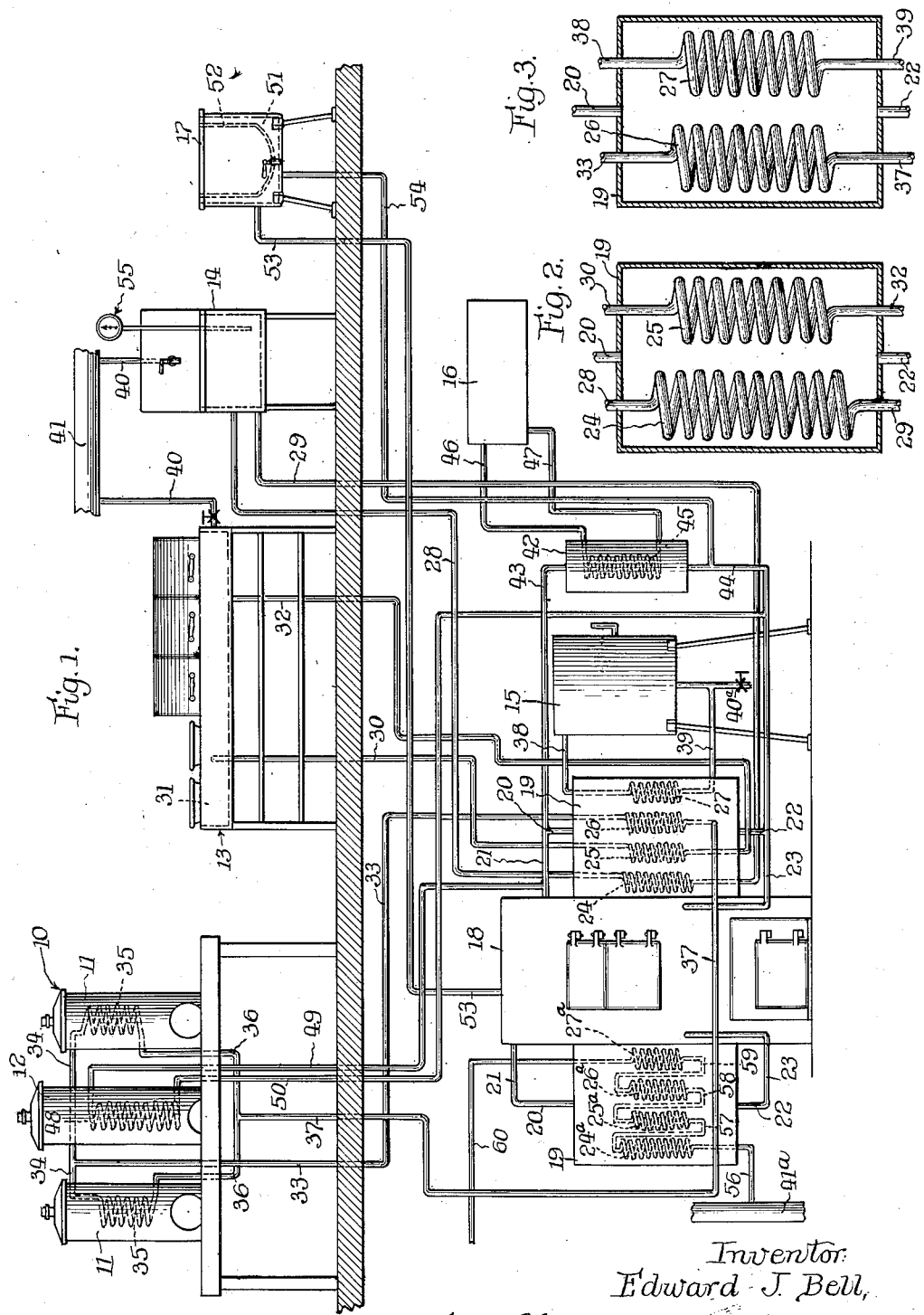
Inventor:
Edward J. Bell,
By Chindahl, Parker & Carlson
Attys.

Patented June 25, 1935

2,006,193

UNITED STATES PATENT OFFICE 2,006,193

HEATING SYSTEM

Edward J. Bell, Chicago, Ill.

Application June 10, 1932, Serial No. 616,542

4 Claims. (Cl. 237—56)

The invention relates to heating systems and has as its general aim the provision of a simple system which is readily adaptable for many uses, as, for example, in operating the various culinary elements in restaurant kitchens, and which is exceedingly efficient in operation.

An object of the invention is to provide a new and improved system wherein a source of heat is utilized for heating a plurality of different elements, each of which may be arranged for operation at different temperatures.

A further object is to provide a novel heating system which may be particularly employed for large scale cooking operations and embodying a number of cooking and kindred devices, which are heated, if desired, to different operating temperatures by separate heating systems so corelated as to receive the proper quantity of heat from a single and common source.

Other objects and advantages will become apparent in the following description and from the accompanying drawing, in which:

Figure 1 is a somewhat diagrammatic view of a heating system embodying the features of the invention.

Figs. 2 and 3 are vertical sectional views through the container in which the heat transfer devices are located, looking in opposite directions.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Broadly the invention contemplates the provision of a heating system embodying a plurality of individual subsystems, each of which includes an element to be heated for operation or actuation at a temperature which may be different from that of other elements, all of said subsystems being arranged to obtain the heat energy required from a common source and to transfer only that amount of heat energy from the source necessary to maintain the associated element at a proper operating temperature.

For convenience in disclosure, the invention has been illustrated and will hereinafter be described in connection with the several cooking utensils and the like employed in restaurant kitchens in the preparation of large quantities of food. These utensils constitute the several elements which are to be heated and since they are for different purposes, it will be evident that the temperatures at which the utensils operate may differ widely.

Referring particularly to Fig. 1 of the drawing, 10 designates generally a battery of coffee making devices comprising a pair of urns 11 for coffee and a water urn 12. 13 designates a steam table, 14 a sink, 15 a boiler for potatoes or the like, 16 a sterilizing apparatus, and 17 a stock pot in which soup or the like is prepared. It will, of course, be obvious that utensils other than those shown herein may be employed.

The heating system includes what may be generally characterized as a source of heat which, in this instance, is shown as being a boiler 18 preferably of the type in which water is heated under a relatively low steam pressure. The specific structure of the boiler forms no part of the present invention and it is not, therefore, necessary to describe the boiler in detail. The boiler is arranged to deliver heated water into a closed container 19 within which a plurality of heat transfer devices are located. One or more of the containers 19 may be employed as desired, depending upon the heating capacity of the boiler and upon the number of different elements to be heated.

Two such containers are herein shown and, since they are substantially alike structurally, only one will be described. The container is preferably mounted closely adjacent to the boiler to reduce the heat loss to a minimum and the upper part thereof is in communication through conduits 20 and 21 with the upper portion of the boiler below the normal water line therein. The lower part of the container is connected through conduits 22, 23 with the lower portion of the boiler. In operation, heated water constantly circulates from the boiler through the conduits 21, 20 into the container 19 to return to the boiler through the conduits 22, 23.

Within the container are a plurality of heat transfer devices. Four of such devices are shown herein and indicated by the numerals 24, 25, 26 and 27. While the devices have been diagrammatically shown in Fig. 1 as being alined, in practice the devices will be more compactly arranged in the corners of a square container or at evenly spaced intervals within a circular container. Preferably the heat transfer devices are in the form of helical coils of a good heat conducting material.

Each of said coils is connected with an element to form a subsystem for heating the element associated therewith. More particularly describing this association of parts, the upper end of the coil 24 is connected by a conduit 28 with the sink 14. The conduit 28 is the inflow line to the sink and, hence, communicates therewith near the top. A conduit 29 constituting a return line from the lower portion of the sink communicates with the lower end of the coil 24.

The upper end of the coil 25 is connected by means of a conduit 30 with the upper portion of a reservoir 31 which is customarily provided in steam table constructions. A conduit 32 leading from the lower portion of the reservoir is connected with the lower end of the coil 25.

The coil 26 is arranged to supply heating medium to the coffee urns 11 through a conduit 33 which leads from the upper end of the coil 26 and thence through branch conduits 34 to heat transfer coils 35 mounted in said urns. The conduit 33 and branch conduits 34 form the delivery line to the coils 35, and the branch conduits 34 are, therefore, connected with the upper ends of the coils 35. The return line from the coils 35 is through branch conduits 36 connected with the lower ends of said coils and leading to a common conduit 37 which is, in turn, connected to the lower end of the coil 26.

The potato boiler 15 is a relatively large receptacle in which potatoes are placed for cooking and this element is heated from the fourth coil 27 by fluid flowing through an intake conduit 38, extending between the top of the coil 27 and the upper portion of the boiler 15, and a return conduit 39 connecting the lower portion of the boiler 15 and lower end of the coil 27. The subsystems embodying the steam table 13, sink 14 and potato boiler 15 are open systems, that is to say, the heating fluid, which usually is water, flows in part through an unconfined space during which flow the heat of the water is utilized. To supply these systems with water or to replenish the water as it is used, pipe lines 40 are arranged to deliver water from a main 41 to the reservoirs or containers of the several systems. The water may be drained from these systems in any suitable manner as by an outlet drain 40ª shown in connection with the potato boiler. The coffee urns 11 are heated through a closed system.

A higher operating temperature is generally required for the sterilizer than for any of the other elements; hence, it is desirable to provide a separate heat transferring device for this element. To this end a small container 42 is provided through which heated fluid from the source or boiler 18 is circulated by a conduit 43, which communicates with the outflow conduit 21 from the boiler 18, and a return conduit 44 connected with the inflow or return conduit 23 to the boiler 18. A heat transferring coil 45 is mounted in the container 42 and the ends of said coil are connected by conduits 46 and 47 with the sterilizer 16.

The center urn 12 is operated directly by the heated fluid from the boiler since this urn must supply water which is approximately at the boiling point. Thus, the urn 12 has a heating coil 48 therein, the upper end of which coil is connected by a conduit 49 with the outflow conduit 21 from the boiler 18. The lower end of the coil communicates through a conduit 50 with the inflow line to the boiler 18 which is represented by the conduits 44, 23.

The stock pot 17 is preferably operated by steam as a heating medium and the structure thereof embodies a steam chamber 51 surrounding a receptacle 52. The chamber is connected through a conduit 53 with the steam space at the top of the boiler 18 and a return conduit 54 for condensate leads to the return conduit 44 and thence into the boiler.

A particular relationship between the various elements, the heat transfer devices associated therewith, and the source of heat is provided by which each of the elements receives only that amount of heat energy necessary to maintain it at its proper operating temperature. This end is attained by associating with each element a transfer device of a predetermined heat transfer capacity. This capacity also, of course, will be dependent upon the normal output temperature of the heating medium obtained from the boiler 18. A better understanding of this arrangement may be had from the following exemplary description of an operating installation. The figures given are approximations.

The boiler 18 is capable of heating water to a temperature of 220° F. under a steam pressure of one and one-half pounds. The water urn 12 operates at a temperature of 215° F., the two coffee urns 11 at a temperature of 180° F., the steam table at a temperature of 200° F., the sink at a temperature of 170° F., the stock pot at a temperature of 215° F. or higher, the potato boiler at a temperature of 212° F., and the sterilizer at a temperature of 215° F. or higher. From the boiler 18 water is delivered to the container 19 at a temperature of 220° F., since there is substantially no heat loss due to the close association of the parts.

The heat transfer capacity of the several coils is varied by properly dimensioning the coils. In this instance the change in dimension is, for simplicity, shown as being a change in length as represented by the different number of turns in the coils. The sink subsystem requires the greatest amount of heat energy, even though the temperature thereof is the lowest of the group largely because of the frequency with which the water in the system must be replenished. Thus, the coil 24 has the greatest heat transfer capacity as represented by ten turns in the coil. The steam table subsystem also requires a large capacity transfer device and the capacity of the coil 25 of this system is represented by eight turns. The subsystem heating the two coffee urns 11 may be supplied from a single coil and, since this system is closed, the heat transfer capacity of the coil 26 may be the same as the capacity of the coil 25 to the steam table. The potato boiler is preferably located closely adjacent to the container 19 to minimize heat loss and the capacity of the coil 27 associated therewith may be relatively small as represented by seven turns in the coil. The subsystem for heating the sterilizer requires a maximum of heat transfer capacity. The coil 45 is, therefore, located in the separate compartment 42 and the capacity of the coil is represented by ten turns. The water urn 12 is heated directly from the boiler 18 and will, consequently, be heated to substantially the temperature of the water flowing from the boiler.

It will be evident from the foregoing that by properly predetermining the heat energy requirements of the various elements which are to be operated and then connecting each of the elements with a heat transfer device of proper transfer capacity, all of the elements may be caused to operate at their required temperatures from a common source of heat. Knowing the total heat energy requirements for the entire system, a boiler may be provided which has a capacity only slightly greater than that required to supply the heat energy necessary for operating the entire system whereby heat waste is eliminated. The system may, therefore, be operated with exceeding efficiency and resulting economy.

When the apparatus is in operation, each of the several elements may and usually will have different heat requirements. The flow of the fluid is naturally induced by the heating of a part of the system and the flow is, in this embodiment, from the coils in the heating container 19 to the different elements and return. When the temperature at both ends of the system is the same or substantially so, there will be no circulating flow or only a very slow flow. On the other hand, if a large temperature differential occurs, the circulation will be rapid up to the capacity of the heat transfer coils. Each coil, therefore, tends always to maintain the temperature in the associated element at the operating temperature thereof, such temperature having been predetermined by the provision of a heating coil of proper heat transferring capacity.

In view of the fact that all of the elements of the system are closely interrelated, a simple means may be provided for indicating to an attendant whether the system is functioning properly. For this purpose, a temperature indicator 55, of suitable construction, is provided for indicating the temperature at which any of the subsystems is operating. Preferably, the indicator is associated with an open subsystem which operates at the lowest temperature, as for example the sink 14. An attendant knowing the proper operating temperature of the sink may determine at a glance whether that temperature is as it should be. If, for example, the attendant sees that the temperature of the sink is 170° F., he knows that every other element in the system is being heated to its proper operating temperature. Similarly, if he sees that the temperature has varied from 170° F., he knows that that variation is also present in every other element and that remedial steps are immediately necessary.

The container 19 at the left-hand side of the boiler in Fig. 1 illustrates the manner in which the heat transfer devices may be joined to supply hot water. The container 19 is connected with the boiler 18 as has been described. A coil of largest capacity 24ª is connected at its lower end to a water supply main 41ª through a conduit 56. A conduit 57 connects the upper end of the coil 24ª with the lower end of the coil of next largest heat transfer capacity, in this instance coil 25ª. Conduits 58 and 59 respectively connect the coils 25ª, 26ª and 26ª, 27ª together in the same manner, the connections being preferably made in the order of decreasing heat transfer capacities. A distributing conduit 60 leads from the top of the last coil 27ª. The several coils thus connected efficiently boost the temperature of the incoming cold water successively to approximately the temperature of the water from the boiler 18.

I claim as my invention:

1. A heating system comprising, in combination, a plurality of elements to be heated to various temperatures, means supplying a heating medium at a predetermined normal temperature, a heat transfer device for each of said elements mounted to be subjected to the heat of said heating medium, means for connecting each element with its coacting heat transfer device to provide systems for transmitting heat to the several devices, said transfer devices having predetermined capacities at the normal temperature of the heating medium for transmitting only the amount of heat energy necessary to maintain each of the associated elements at a predetermined operating temperature, and means operatively connected with the system operating at lowest temperature for indicating the operating condition of all of said systems.

2. In a heating system, the combination of a plurality of elements to be heated to different operating temperatures by hot water as a heating medium, at least one of said elements being open so that such water is exposed therein, a heating coil connected with each of said elements to form complete heating systems, a source of heat common to all of said coils and having a maximum temperature limit, each of said coils being predetermined to have that heat transfer capacity which will maintain the element associated therewith at its operating temperature when the source of heat is at the maximum temperature limit, and temperature indicating means associated with the open one of said elements.

3. In a heating system, the combination of a plurality of operating elements to be heated to different operating temperatures by the current flow induced by the heating and cooling of water as a heat transfer medium, a heat transfer coil connected with each of said elements to form complete flow systems, and a source of heat common to all of said coils and having a maximum temperature limit, each of said coils having that predetermined heat transfer capacity which will maintain the element associated therewith at its operating temperature when the source of heat is at said maximum temperature limit.

4. In a heating system, the combination of a plurality of elements to be heated to different operating temperatures, a heat transfer coil for each of said elements, means for connecting each coil with its corresponding element to provide a circulatory system for a heating fluid, and a source of heat common to all of said coils and having a normal temperature level, each of said coils having a predetermined heat transfer capacity for maintaining the element associated therewith at its predetermined operating temperature when said source is at said normal level by the flow of heating medium induced when the medium is heated in the coil and cooled at the element associated therewith, whereby each element will be supplied only with that amount of heat necessary to maintain it at its predetermined operating temperature independently of the amount of heat required by and supplied to any other element.

EDWARD J. BELL.